United States Patent
Bain et al.

[15] 3,638,011
[45] Jan. 25, 1972

[54] HAND GLOVE AND LIGHT SIGNAL ATTACHMENT THEREFOR

[72] Inventors: Merril H. Bain, 10333 South 74th Ave., Palos Hills, Ill. 60465; Michael R. Bucher, 8250 West 90th St., Hickory Hills, Ill. 60457

[22] Filed: June 1, 1970

[21] Appl. No.: 42,073

[52] U.S. Cl. .........................................240/6.4 W, 340/321
[51] Int. Cl. ...................A41d 19/00, G08b 5/00, F21v 33/00
[58] Field of Search......................240/6.4 W, 6.4 F; 340/321

[56] References Cited

UNITED STATES PATENTS

| | | | |
|---|---|---|---|
| 1,046,225 | 12/1912 | Schindler | 240/6.4 W X |
| 1,496,484 | 6/1924 | Monaco | 340/321 |
| 1,402,609 | 1/1922 | Hodous | 340/321 |
| 1,531,373 | 3/1925 | Bigelow | 340/321 |
| 1,504,980 | 8/1924 | Schultz | 340/321 |

Primary Examiner—Louis R. Prince
Assistant Examiner—Daniel M. Yasich
Attorney—Charles B. Cannon

[57] ABSTRACT

A combination hand glove and electric light signal attachment in which the electric light signal is mounted on the hand or finger portion of the glove and an electric battery and a manually operated switch unit for the electric light signal unit are mounted in the wrist portion of the glove as worn on one hand of the user. The switch unit is arranged in an electrical circuit which interconnects the light signal and the electric battery switch unit and when the wearer of the glove wishes to illuminate the electrical light signal he may do so by manually actuating the switch unit with his free hand, thereby closing the electrical circuit to the electric light signal.

1 Claims, 7 Drawing Figures

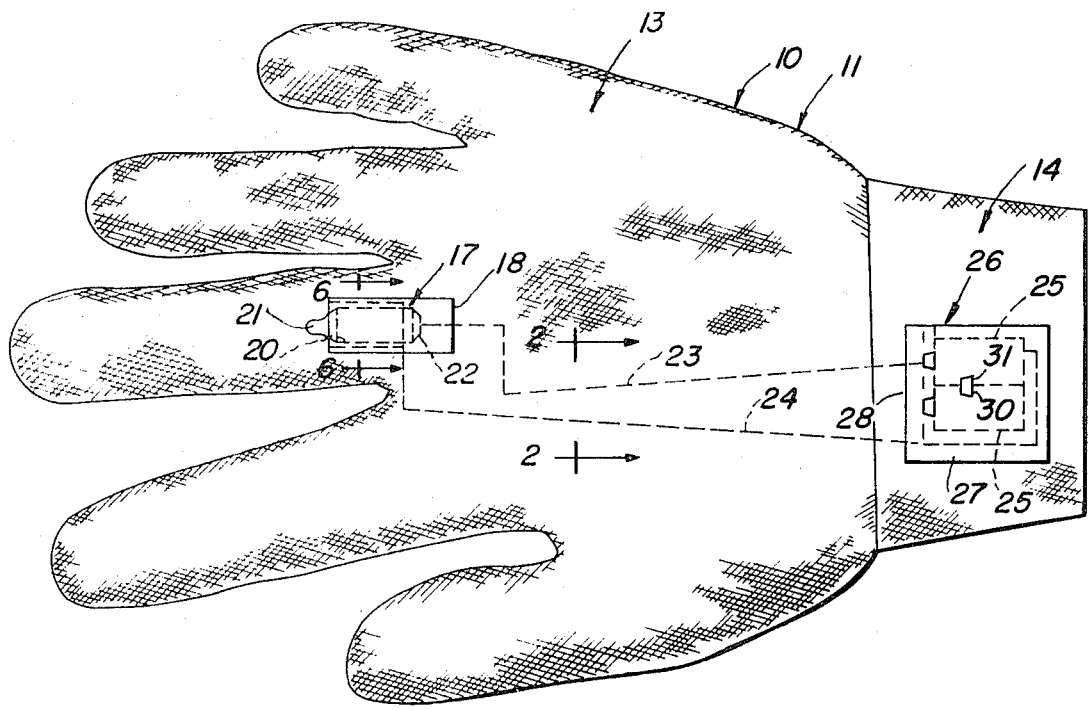

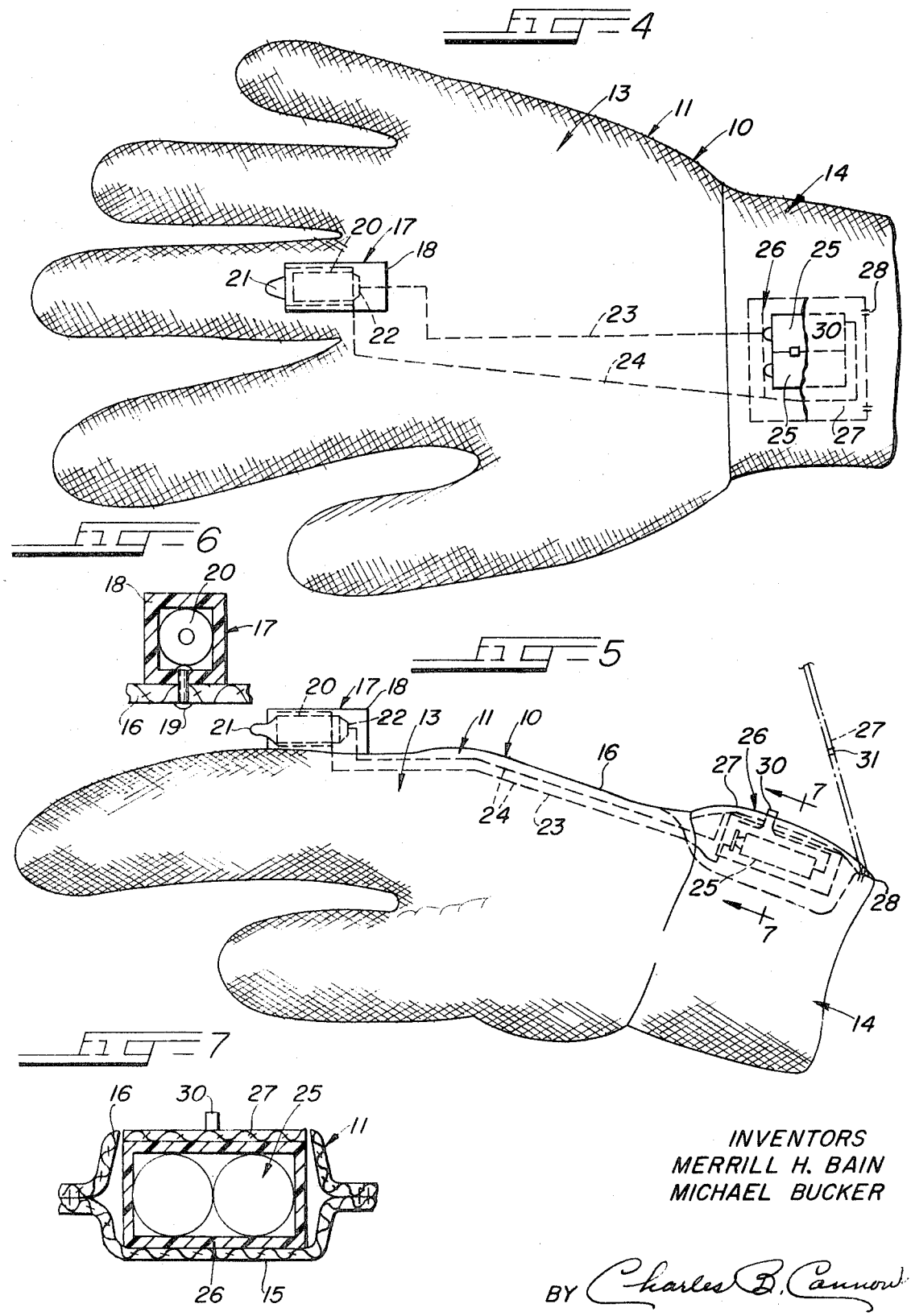

HAND GLOVE AND LIGHT SIGNAL ATTACHMENT THEREFOR

OBJECTS

An object of the invention is to provide a new and improved combination hand glove and electric light signal unit adapted for use by workmen, including railroad men, service station men, and the like, and which may be worn on one hand of the user, and which includes an electrical circuit embodying an electrical light signal and a manually operable switch unit which is manually operated by the free hand of the user to close the circuit to the signal lamp.

Another object of the invention is to provide a new and improved combination hand glove and electric light signal unit therefor which are so constructed and arranged that they do not interfere with the wearer's manipulation of the glove unit and the use of the hand upon which the glove is worn.

Other objects will appear hereinafter.

DETAILED DESCRIPTION

FIG. 1 is a top plan view of a preferred embodiment of the new combination hand glove and electric light signal unit therefor;

FIG. 2 is a fragmentary sectional detail view on line 2—2 in FIG. 1;

FIG. 3 is a schematic diagram of the electrical circuit embodied in the invention;

FIG. 4 is a top plan view, similar to FIG. 1, but showing part of the cover flap for the housing or pocket electrical battery and switch unit broken away to reveal these parts;

FIG. 5 is a side elevational view of the new hand glove and light signal attachment therefor, as shown in FIGS. 1 and 4, but showing the cover flap for the battery unit and the manually operable switch unit in raised position, in dotted lines;

FIG. 6 is an enlarged sectional detail view of the light signal unit, on line 6—6 in FIG. 1; and FIG. 7 is an enlarged sectional detail view of the battery unit and switch unit and the housing therefor, on line 7—7 in FIG. 5.

A preferred embodiment of the new combination hand glove and electric light signal unit therefor are shown in FIGS. 1 to 7, inclusive, of the drawings wherein it is generally indicated at 10, and comprises a fabric glove unit 11 which includes a hand and finger portion 12 and a wrist portion 13, with both the hand and finger portion 12 and the wrist portion 13 being made of cotton cloth or any other suitable fabric which includes inner and outer layers 15 and 16, as shown in FIG. 2.

The new combination hand glove and electric light signal unit therefor includes an electric light signal unit, generally indicated at 17, and which includes a water-resistant, flexible rubber or like housing 18 which is suitably mounted, as at 19, on the outer fabric layer 16 of the hand and finger portion 13 of the glove 11 and houses a small electric signal lamp 20 which is suitably mounted in the housing 18 (FIG. 6). The housing 18 has an open front end and the reduced diameter front end portion 21 of the electric signal lamp 20 projects through the front end portion of the housing 18; a lamp socket 22 being mounted in the rear end portion of the housing 18 for holding the electric signal lamp 20-21.

The new hand glove and electric signal unit 10 includes an electrical circuit, generally indicated at 23 (FIG. 3), which embodies a pair of conductor wires 24 which are arranged within or between the inner and outer fabric layers 15 and 16 of the glove unit 11 and which lead back from the socket 22 for the electric signal lamp 20 to a dry cell battery unit, generally indicated at 25, and to a manually operable switch unit 29, which are housed in a water-resistant, flexible rubber or like housing or pocket 26 which is suitably formed between the inner and outer fabric layers 15 and 16 of the wrist portion 14 of the glove 11. The housing or pocket 26 for the battery unit 25 and for the manually operable switch unit 29 has a hinged cover flap 27 which is free at its front end and sides but is hingedly connected at its rear end, as by stitching 28, to the upper and outer fabric layer 16 of the wrist portion 13 of the glove unit 11. The dry cell battery unit 25 is arranged in series in the circuit 23 with a manually operable switch unit 29, of conventional design, which is mounted in the housing or pocket 26 and includes a manually operable snap switch member 30 which projects through an opening 31 in the cover flap 27 for the pocket or housing 26 above the latter (FIGS. 1, 4, 5 and 7).

The construction and arrangement of the parts, as shown in FIGS. 1 to 7, inclusive, are such that the combination hand glove and electric signal lamp unit 10 may be worn on one hand of the user with the cover flap 27 for the housing or pocket 26 for the battery unit 25 and the switch 29-30 in closed position. In order to energize and illuminate the electric signal lamp 20-21, the user depresses the normally open manually operable switch member 30 with his free hand, thereby closing and energizing the circuit 23-24 and thus illuminating the signal lamp 20-21, the front end portion 21 of which may be readily seen from the front and sides thereof, thus affording a new and useful combination glove and electric signal lamp unit for workmen, including railroad men, service station men, and the like, to be used at night. When thus worn the new combination hand glove and electric signal lamp unit will not interfere, in any way, with the normal use of the wearer's hand.

In order to gain access to the pocket or housing 26 for the battery unit 25 and the switch unit 29-30, to replace one of the batteries, or to repair the switch unit 29-30, the cover flap 27 may be raised at its hingedly stitched rear end 28, into open position, as in dotted lines FIG. 5, and when the cover flap 27 is in closed position the snap switch member 30 projects through the opening 31 in the cover flap 27.

It will thus be seen from the foregoing description, considered in conjunction with the accompanying drawings, that the present invention provides a new and improved combination hand glove and electric signal lamp unit therefor having the desirable advantages and characteristics and accomplishing its intended objects including those hereinbefore pointed out and others which are inherent in the invention.

We claim:

1. A combination hand glove and electric signal lamp unit therefor comprising
    a. a flexible glove body including
        1. a wrist portion; and
        2. a hand and finger portion;
    b. an electrical signal lamp unit mounted externally on said hand and finger portion of said flexible glove unit and having
        1. a front end portion visible from the front of said glove unit;
    c. means for mounting said electrical signal lamp unit on said hand and finger portion of said flexible glove unit including
        1. an electrical lamp socket for said electrical signal lamp unit;
    d. an electrical battery unit carried by said wrist portion of said flexible glove unit;
    e. an electrical circuit including electrical conductor means arranged within said flexible glove body and interconnecting said electrical lamp socket and said battery unit;
    f. manually operable switch means carried by said wrist portion of said flexible glove body for closing said electrical circuit to energize said electrical signal lamp unit; said wrist portion of said flexible glove body having therein
        1. a housing or pocket;
        2. said battery unit and said switch unit being disposed in said housing or pocket;
    g. said housing or pocket including
        1. a cover flap hingedly connected to said wrist portion of said flexible glove body and normally closing said housing or pocket;
    h. said wrist portion including 1. an inner layer; and
2. an outer layer; and
3. said housing or pocket being formed between said inner and outer layers of material in said wrist portion of said flexible glove body; and i. said switch means including a manually operable switch member having a portion normally projecting through and above said cover flap of said housing or pocket.

* * * * *